United States Patent [19]

Choly et al.

[11] Patent Number: 4,809,747
[45] Date of Patent: Mar. 7, 1989

[54] QUICK DISCONNECT DEVICE

[75] Inventors: Mitchell Choly, Troy; Dante C. Zuccaro, Warren; Frederick A. McCurdy, Royal Oak, all of Mich.

[73] Assignee: General Motors Corporation, Detroit, Mich.

[21] Appl. No.: 80,431

[22] Filed: Jul. 31, 1987

[51] Int. Cl.⁴ ............................................. F16K 37/28
[52] U.S. Cl. ................... 137/614.06; 901/41; 901/42; 285/18
[58] Field of Search ............... 137/614.06; 901/41, 901/42, 37; 285/18

[56] References Cited

U.S. PATENT DOCUMENTS

| | | | |
|---|---|---|---|
| 3,976,099 | 8/1976 | Russell | 137/614.06 |
| 4,453,566 | 6/1984 | Henderson, Jr. et al. | 285/18 |
| 4,549,846 | 10/1985 | Torii et al. | 901/30 |
| 4,592,387 | 6/1986 | Rogers | 137/614.06 |
| 4,611,377 | 9/1986 | McCormick et al. | 29/407 |
| 4,636,135 | 1/1987 | Bancon | 901/41 |
| 4,710,093 | 12/1987 | Zimmer et al. | 901/41 |

OTHER PUBLICATIONS

EOA Systems Incorporated, 1986.

Primary Examiner—A. Michael Chambers
Attorney, Agent, or Firm—Ernest E. Helms

[57] ABSTRACT

The present invention provides an apparatus and method of utilization thereof of a quick disconnect coupling for attaching an end of arm tool (EOAT) to a robot or like wherein there is fluid communication between the robot end of the coupling and the EOAT of the coupling. The coupling of the present invention also is designed so that fluid communication can only occur after the coupling halves are joined and sealed together. Fluid communication is cut off before the coupling halves can separate from each other thereby minimizing leakage during the coupling operation.

12 Claims, 5 Drawing Sheets

QUICK DISCONNECT DEVICE

FIELD OF THE INVENTION

Figure 6:
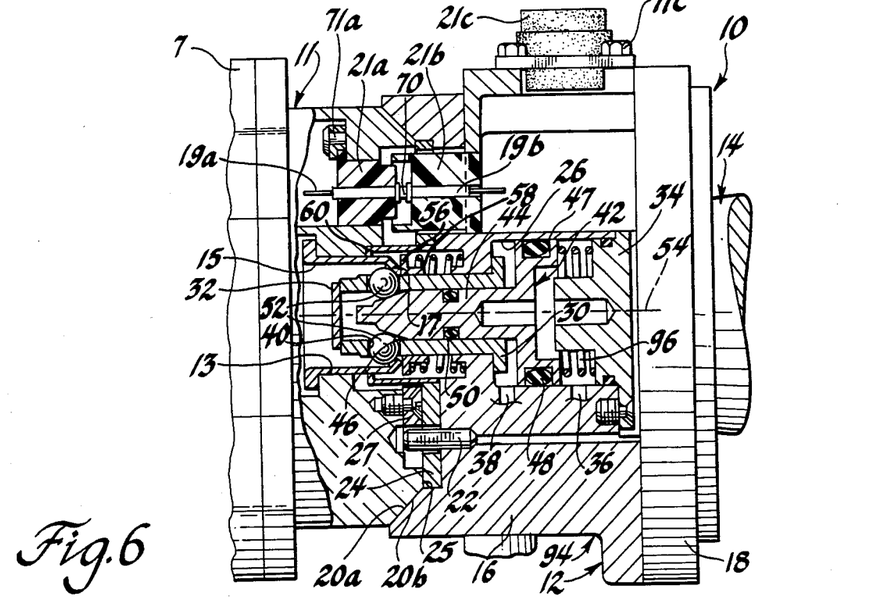
FIG. 6 is a sectional view of the Zuccaro et al quick disconnect device.

The field of the present invention is that of quick disconnect coupling for coupling an end of arm tool (EOAT) with fluid lines to a robot or like. More particularly, the present invention relates to robotic coupling with fluid connections particularly adaptable in robotic welding applications. This application presents modifications and improvements to the quick disconnect device disclosed in the application to Zuccaro et al, U.S. Ser. No. 039,091, filed Apr. 16, 1987 (FIG. 6), and the disclosure of that application is incorporated herein.

DISCLOSURE STATEMENT

It is known in the art to provide quick disconnect type coupling for an end of arm tool and a robot or the like. One side of the coupling, referred to as the tool changer, is connected with the robot or the like. The other side of the coupling, referred to as a tool adapter, is connected with the EOAT. Both the tool changer and the tool adapter have spring biased valves biased to a normally closed position. Typically, the valves will be of a poppet type having conical seats. On the tool changer side, the valve stem will be spring biased towards the tool adapter to mate with the conical seat. On the tool adapter side, the conical valve will be spring biased toward the tool changer to mate with its respective conical seat. As the tool adapter and tool changer are brought towards one another, the valves will make contact with each other and relative movement between the valves will end. However, as engagement between the tool adapter and tool changer continues, the conical seats of both valves will tend to move towards each other, thereby providing a clearance between the conical seats and the valve members allowing fluid communication between the tool adapter and tool changer.

The above configuration has several disadvantages. One disadvantages is that fluid communication between the tool changer and the tool adapter can occur before the coupling is fully locked together. The above can cause a leakage of fluid which is especially undesirable when attaching an electric water cooled welding gun to a robot since there are several electrical connections which are also made between the robot and the weld gun by the coupling.

When the valves are first open, the pressurized fluid is exposed to an enlarged pressure boundary area which now includes the tool adapter and EOAT. The above results in a force which tends to pull the tool adapter away from the tool changer. Additionally, the springs which bias the valves of the tool adapter and changer to the closed position must be compressed at the same time that the coupling is being joined together. Therefore, an external force must be supplied to overcome the valve spring force and the pressure force of the fluid when joining the coupling together. The above-noted forces can often be very significant causing increased loading on the robot or like. The additional loading on the robot is transmitted to the gear train or actuator of the robot arm and has a deleterious effect on the life and accuracy of the robot arm. The above factors can often mandate the use of a larger, more expensive robot or like than desired for a given application.

To minimize the compressive force component of the valve spring, it has often been design practiced to provide the fluidic lines at as small a diameter as possible to minimize the valve spring diameter. However, the above practice minimizes the flow which can be delivered to the EOAT for a given cooling system pressure.

SUMMARY OF THE INVENTION

To overcome the above-noted and other problems, the present invention is brought forth. The present invention provides a coupling wherein the tool changer and tool adapter can be coupled to one another before any opening of the valves. Therefore, the actuator which couples the tool changer to the tool adapter does not at the same time have to compress the valve springs. Also, more importantly, the tool adapter and tool changer are coupled to one another and the fluid lines between the tool adapter and tool changer are sealed to one another before the valves are open. In fact, the valves of the present invention cannot be opened until the coupling is coupled together. In like manner, separation of the tool changer and tool adapter cannot occur until the valves have returned to the closed position thereby ending fluid communication between the tool adapter and tool changer. A preferred embodiment of the present invention further allows a separate actuating action which not only opens the valves but further increases the connective force between the tool adapter and the tool changer. The present invention also provides an advantage in that the valves are modular and can be used with gases or liquids without major modification.

The present invention provides an apparatus and method of utilization thereof of a quick disconnect coupling to connect an EOAT to a robot or like.

It is an object of the present invention to provide a quick disconnect coupling for coupling an EOAT with at least one fluid line to a robot or like with at least one fluid line said coupling including, a tool adapter for holding the EOAT having at least one fluid line, and a tool changer for connection with the robot or like, the tool changer being adapted for coupling and sealing, and then sequentially fluidly communicating with said tool adapter the tool changer including, a shell with at least one fluid line with a valve biased to a closed position, means to couple the tool changer to said tool adapter, means to seal the fluid passage of the tool adapter with the fluid passage of the tool changer, and means to open the biased valve of the tool changer fluid line whereby fluid communication between the fluid line of the tool adapter and the fluid line of the tool changer can occur only after the tool adapter and the tool changer are coupled with one another and the tool adapter and the tool changer fluid lines are sealed to one another and whereby the valve of the tool changer is returned to a closed position before the tool changer and the tool adapter can separate from one another.

It is an object of the present invention to provide a quick disconnect coupling for connecting an EOAT with fluid lines to a robot or like, the coupling including a tool adapter for holding the EOAT having a generally axial central cavity and a generally axially orientated member boarding the central cavity projecting toward the robot or like, and the tool adapter having a plurality of fluid lines with poppet valves biased to a closed position, and a tool changer adapted for sequentially mating, coupling and sealing, and then fluidly communicating with the tool adapter, the tool changer being connected with the robot or like and the tool changer including, a shell with a generally axial interior chamber, the shell also having first and second passages axially separated from one another fluidly connecting the outside of the shell with the interior chamber, and the shell having a plurality of geometrically spaced radial apertures intersecting the interior chamber axially separated from the first and second passages and being towards the tool adapter, a rod slidably mounted in the interior chamber spring biased towards the tool adapter with a cam portion adjacent the radial apertures and the rod also having a flange toward the robot or like and a step between the radial apertures and the flange, locking balls mounted within the radial apertures for interacting with the cam portion of the rod and the axially orientated member to couple the tool changer with the tool adapter, closure means biased to a first position whereby the radial apertures are closed when the tool changer and the tool adapter are not mated and being moved to a second position by the axially orientated member to open the radial aperture when the tool changer in the tool adapter are mated, the opening of the aperture allowing said rod to move to a position causing the locking balls to be captured between the cam portion of the rod and the axially elongated member to couple the tool changer with the tool adapter, sealing means causing the fluid lines of the tool adapter and the tool changer to seal with one another when the tool adapter and the tool changer are coupled with one another, a poppet valve with a stem extending into the interior chamber, the poppet valve being biased to a closed position, and a piston located within the interior chamber separating the first and second passages, the piston being slidably mounted on the rod between the step and the flange whereby the piston in respond to a fluid being fed into the interior chamber through the first passage can contact with the valves stems of said tool changer to open the valves of the tool changer and the tool adapter only after the rod has moved to couple the tool adapter with the tool changer and the piston can be further moved toward the tool adapter to contact the step of the rod to further lock the tool adapter to the tool changer and whereby the piston must be moved away from the tool adapter in response to a fluid fed into the interior chamber through the second passage to allow the valves of the tool adapter and the tool changer to return to a closed position and then sequentially move further toward the robot or like to contact the flange to pull the rod away from the tool adapter to allow the tool adapter to disconnect from the tool changer thereby insuring the closure of the valves before the tool adapter or the tool changer are released from one another.

It is an object of the present invention to provide a method of connecting an EOAT with a fluid line to a robot or like with a fluid line, the method including connecting with said EOAT a tool adapter for holding said EOAT with at least one fluid line, and connecting with the robot or like a tool changer adapter for coupling, sealing and then sequentially fluidly communicating with the tool adapter, valving the fluid line in the tool changer with a valve biased in a closed position, connecting the tool changer to the tool adapter, sealing the fluid line of the tool adapter with the fluid line of tool changer, opening the valve of the tool changer whereby fluid communication between the fluid line of the tool adapter and the tool changer can only occur after the tool adapter and the tool changer are connected with one another and the fluid lines of the tool changer and the tool adapter are sealed to one another and whereby the valve of the tool changer is returned to a closed position before the tool changer and the tool adapter can separate from one another.

Other objects and advantages of the present invention will become more apparent to those skilled in the art as the nature of the invention is better understood from the accompanying drawings and a detailed description.

DETAILED DESCRIPTION OF THE DRAWINGS

Referring to FIGS. 1-5 and 7, an EOAT 7 has connected thereto the tool adapter portion 11 of the quick disconnect coupling 10 of the present invention. Connected with the robot 14 is the tool changer 12 of the quick disconnect coupling 10. The tool changer 12 is adapted for mating, coupling and sealing and then sequentially fluidly communicating with the tool adapter 11.

The tool adapter 11 provides electrical power and control lines as well as fluid connections for the EOAT 7. The tool adapter 11 has a primary main body 18 (FIGS. 3, 4 and 7) directly coupled to the EOAT and a secondary body 59 which supports the electrical connections. The primary body 18 of the tool adapter 11 has at least one generally axially orientated member 15 bordering a cylindrical axial central cavity 13. As shown axially orientated member 15 is tubular shaped having an inward facing flange 17.

The tool adapter secondary body 59 (FIG. 2) has electrical control cable or lines 19a and a power connector 21a for providing power to the EOAT along with a conical locator 28 and ground leads 29.

Figure 3:
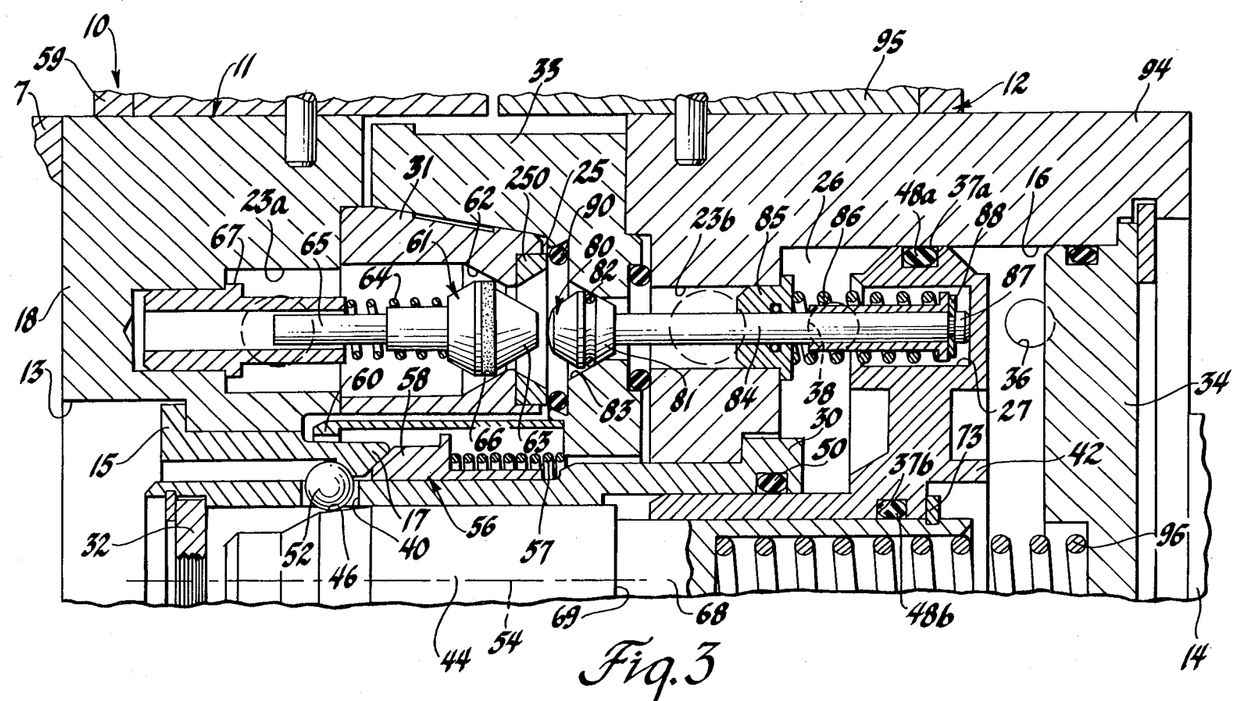
FIG. 3 is a view taken along line 3—3 of FIG. 1 illustrating the valves in the normal biased closed position.
Figure 4:
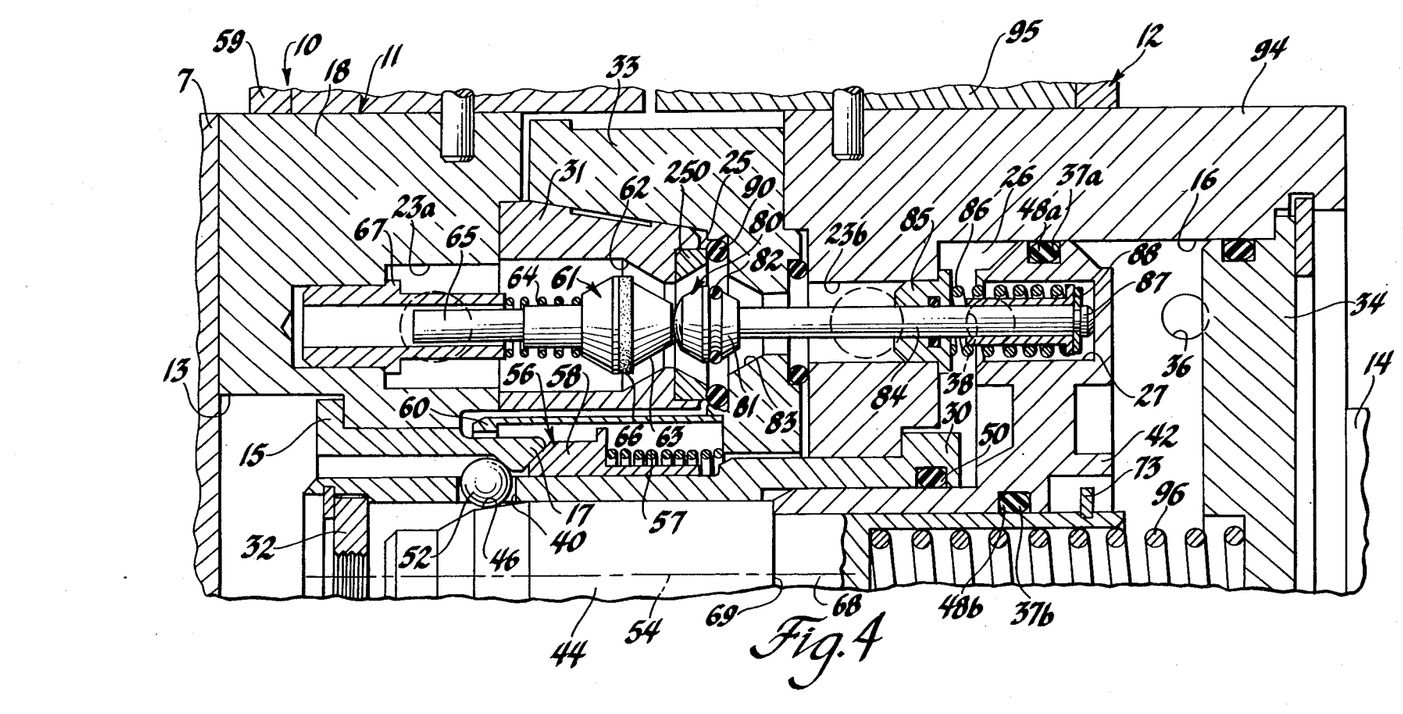
FIG. 4 is a view similar to that of FIG. 3 illustrating the valves in the final open position.
Figure 7:
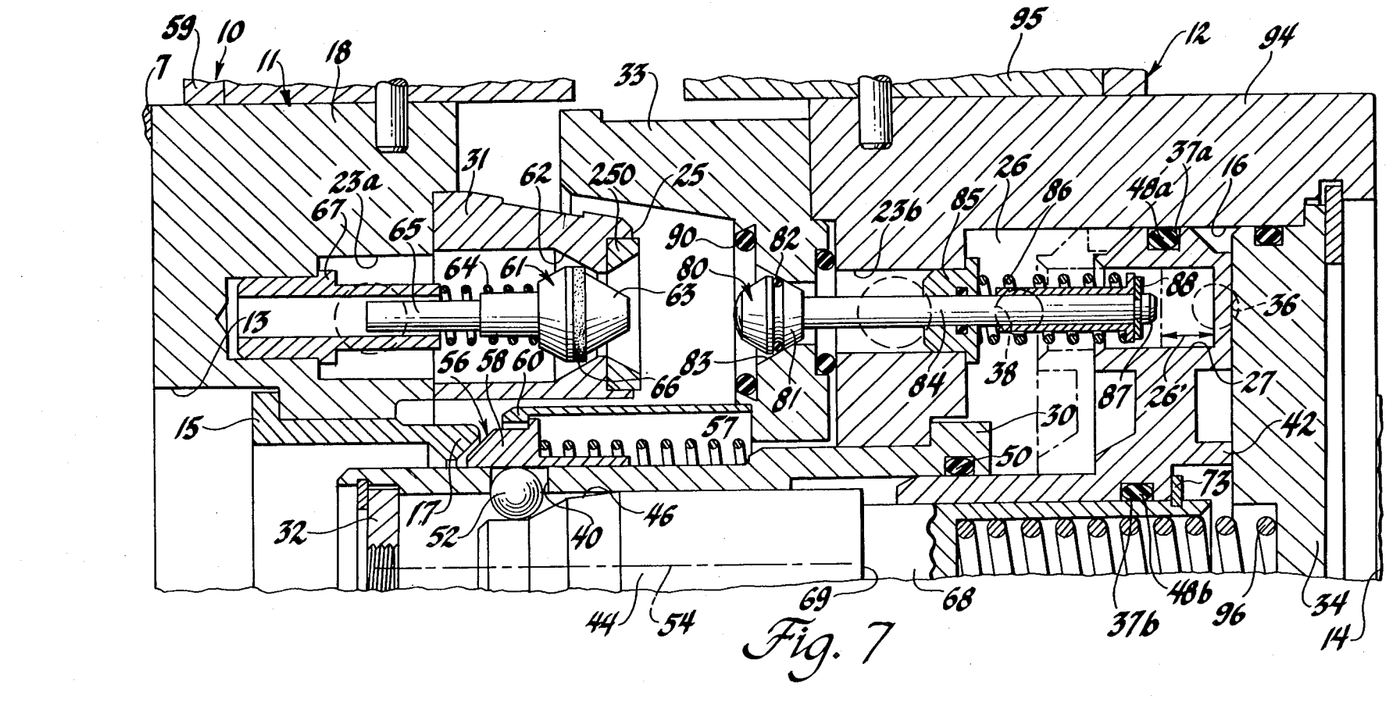
FIG. 7 is a view similar to that of FIG. 3 illustrating the tool adapter and tool connector before coupling.

The tool adapter primary body 18 has a plurality of fluid lines 23a (FIGS. 3, 4 and 7). The fluid line 23a has a radial portion which intersects an axial portion, which in turn intersects a face 25 of the tool adapter 11. Within line 23a of the tool adapter 11 there is provided a valve 61. Valve 61 has a conical seat 62, a valve poppet 63 with a rectangular cross sectional O-ring 66. And as shown in FIG. 3 valve 61 is biased to the closed position. Valve 61 also has a stem 65 which fits within a valve bore insert 67 typically press fitted within the tool adapter primary body 18. Captured between the valve insert 67 and the poppet 63 of the valve 11 is a spring 64 which biases the valve 61 to a normally closed position.

A compression ring 250 is provided with the primary tool adapter body 18 to mate with an O-ring 90 of the tool changer 12 within fluid line 23b of the tool adapter. O-ring 90 in cooperation and contact with compression ring 250 supplies the means to seal line 23a with line 23b. It is apparent to those skilled in the art the O-ring 90 and compression ring 250 can be reversed.

Figure 1:
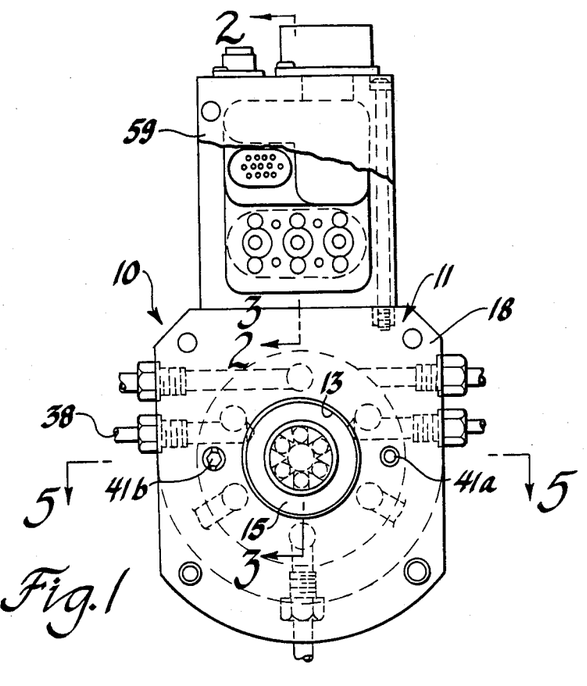
FIG. 1 is a front elevational view with portions cut away of a preferred embodiment quick disconnect coupling according to the present invention.
Figure 2:
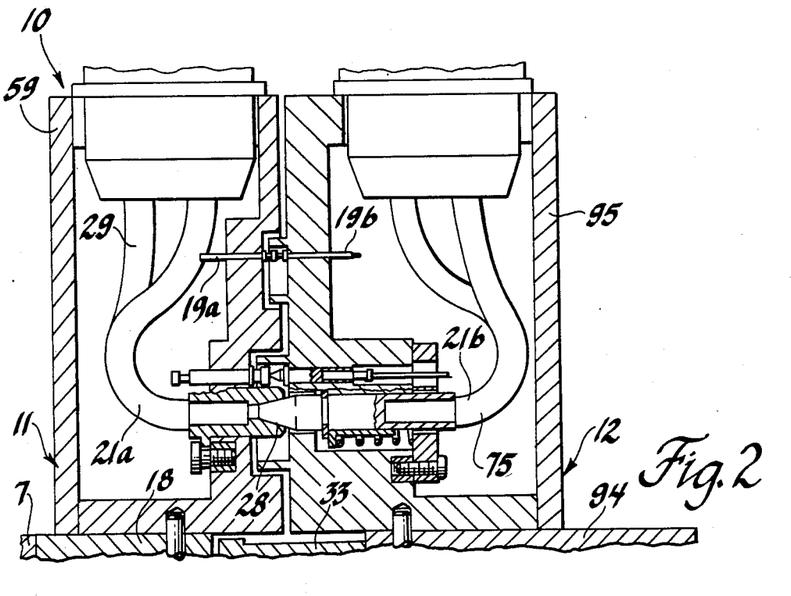
FIG. 2 is a view along lines 2—2 of FIG. 1.

The tool changer 12 has a primary shell 94 (FIGS. 3, 4 and 7) and a secondary shell 95 (FIG. 2). The secondary shell 95 provides the electrical connections 19b and 21b which mate with the previously described electrical connections 19a and 21a of the tool adapter 11. The secondary shell 95 also has a central electical ground 75 which mates into a conical electrical receptor 28 of the tool adapter 11.

Figure 5:
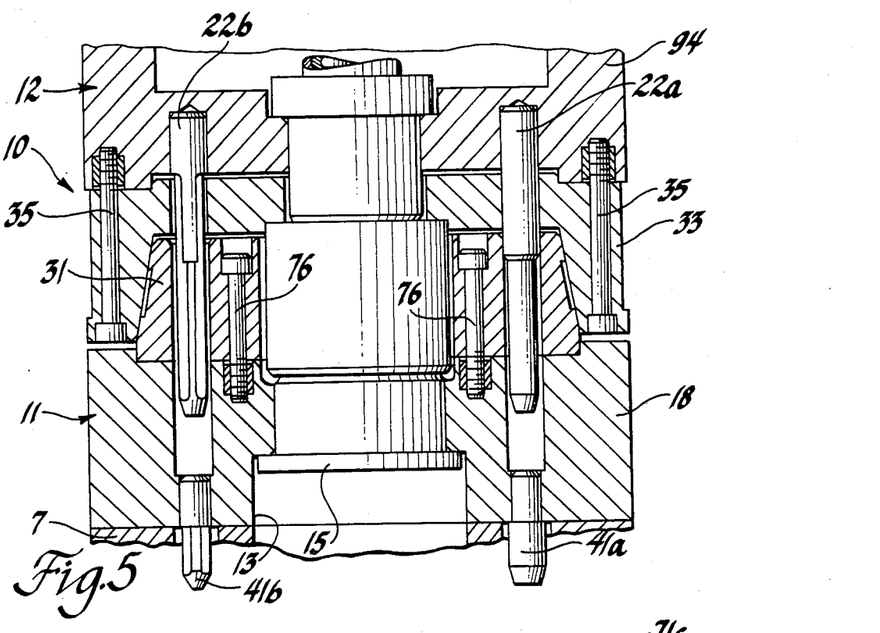
FIG. 5 is a view along line 5—5 of FIG. 1.

Referring to FIG. 5, tool adapter 11 has a conical head 31 secured to main body 18 by bolts 76. In a similar manner tool changer 12 has a head 33 secured to primary shell 94 by bolt 35. Press fitted within a bore in primary shell 94 are pins 22a and 22b. Pins 22a and 22b have a smaller diameter section for locating the tool changer 12 with the tool adapter 11 and a wider diameter section for alignment. Pin 22b is a diamond pin providing slightly increased clearance during alignment. Pins 41a and 41b are provided to align the tool adapter 11 with the EOAT 7.

The tool changer 12 (FIG. 3) has a plug 34 providing a pressure boundary for primary shell 94. The tool changer 12 also has a generally axial interior chamber 26 formed by a cylinder wall 16, an inner shell member 30, cap 32 and, as previously mentioned, plug 34.

Intersecting the interior chamber 26 are first and second fluid passages 36 and 38, respectively, which are provided for a pneumatic air control system. The interior chamber 26 also has axially separated from the first passage 36 and the second passage 38, on the end of the tool changer 12 away from the robot 14 (towards the tool adapter 11) a plurality of generally radial apertures 40 usually equally geometrically spaced. Slidably mounted within the inner shell 30 is a rod 44, spring biased by spring 96. The rod 44 has a cam portion 46 which usually provides a cam angle between 5° and 9° in relationship to an axial center line 54 of the rod 44. The rod 44 also has a reduced diameter end 68, a step 69 and a flange provided by ring 73, on an end of the rod 44 toward robot 14.

Slidably mounted within an inner chamber 26 also is piston 42. The piston 42 is also slidably mounted on the rod reduced diameter 68 and is captured on the rod 44 between the step 69 and flange 73. Inner and outer O-rings 48a and b within annular grooves 37a and b divides the interior chamber 26 into separate sealed sections between the first and second passages 36 and 38, respectively. O-ring 50 within an angular chamber of the inner shell member 30 fluidly isolates the apertures 40 from the remainder of the interior chamber 26. Movingly mounted within each radial aperture 40 is a locking member typically a ball 52 to couple the tool changer 12 with the tool adapter 11.

The rod 44 has an actuated (FIG. 3) and a nonactuated (FIG. 7) position. In the nonactuated position, the rod 44 is in a generally retracted position and the balls 52 are allowed to be positioned inwardly. To provide the means to couple the tool adapter 11 to the tool changer 12, the rod 44 is extended to the coupling position, the cam portion 46 of the rod 44 interacts with the balls 52. The intersection of the cam portion 46 of the rod 44 with the balls 52 causes the balls to be captured between the cam portion 46 and the flange 17 of the axially elongated member 15 (FIG. 4) coupling the tool changer 12 with the tool adapter 11.

Cap 32 has a threaded bore. In cases of air system failure the coupling 10 can be manually separated by threadably inserting a jack screw through the bore and pushing rod 44 back towards the plug 34. When not being used in the above manner, the bore of cap 32 can be covered with a plastic or rubber cover. The fit of cap 32 within inner shell member 30 allows a sufficient amount of air to escape when rod 44 is actuated toward EOAT 7 to prevent an air lockup on rod 44.

When the tool changer 12 and the tool adapter 11 are uncoupled (FIG. 7), the apertures 40 are covered by a closure means 56, ring 58 which is spring biased. The ring 58 in the uncoupled position mates with a fixed angular cover 60, which surrounds the interior chamber 26 to seal the apertures 40 from the environment. It has been found that the coupling of the tool changer 12 with the tool adapter 11, that a 7° cam angle allows the coupling halves to be held together even if there is a failure of the spring 96. To couple the tool adapter 11 with the tool changer 12, the actually elongated member 15 first pushes the closure ring 58 downward against the action of spring 57. The above action opens apertures 40 allowing the balls 52 to be pushed outward by the cam portion 46 of the rod 44. Due to the large mechanical advantage, coupling between the tool adapter 11 and the tool changer 12 is prevented unless closure ring 58 has been moved to allow the balls 52 to be extended outward and for rod 44 to move to a position of engagement.

In the fluid line 23b of the tool changer 12, there is also provided a valve 80. Valve 80 is a poppet type valve having a poppet member 81 joined to a stem 84. Stem 84 extends into interior chamber 26. The poppet has an O-ring 82 which contacts seat 83 to seal line 23b of the tool changer. Valve 80 also has a valve insert 85 which supports and seals the valve stem 84 from the interior chamber 26. Captured between the valve insert 85 and a flange 88 is a spring 86 which provides the biased closing force for the valve. The valve stem 84 has an end 87 which is located within a well 27 of the piston 42.

In operation, the robot 14 or like inserts the inner shell 30 of the tool changer 12 into the axial central cavity 13 of the tool adapter 11 to pick up the tool adapter 11 (FIG. 7). First 36 and second passages 38 will be vented to the atmosphere. The tubular axially elongated member 15, interior flange 17 pushes closure ring 58 towards robot 14. Balls 52 can now be pushed outward by the rod 44 as the rod 44 is advanced by the spring 96. At this point, the tool adapter adapter 11 (inner shell 30, head 33 and outer primary shell 94) will be joined with the tool changer 12 in a positionally fixed manner (FIG. 3). Also, seal ring 250 will mate and seal with O-ring 90 thereby sealing the fluid line 23a of the tool adapter with the fluid line 23b of the tool changer 12. Valves 61 and 80 will still remain in a closed position.

By virtue of flange 73, movement of rod 44 to an engaged (FIG. 3) position will cause piston 42 to travel a distance 26' still having a slight clearance with an end 87 of the stem 84 of the valve 80. To open the valves 80 and 61, passage 38 will remain vented to the atmosphere and air will be admitted into first passage 36 bringing piston 42 into contact with end 87 of the valve stem 84. As the valve 80 is pushed to the left, as shown in FIG. 4, poppet 81 is lifted off of seat 83 and also contacts valve 61 to push the poppet 63 off of the seat 62 to allow fluid communication between the tool adapter 11 and the tool changer 12. Further pressurization through the first passage 36 allows the piston 42 to slide on reduced diameter portion 68 of rod 44 until it hits step 69. After hitting step 69, piston 42 will even further tighten the connection between the tool adapter 11 and the tool changer 12 by urging rod 44 toward the tool adapter 11. The relatively large area of piston 42 provides enough closing force to allow the valves 80 and 61 to be of a much greater diameter, even though the valves larger diameter require much stiffer biasing springs.

As the valves 80 and 61 are fully opened, first passage 36 can be closed and no further pressurized air need be delivered through first passage 36 to maintain piston 42 in its position of contact with stem end 87 except for any slight leakage which may occur from the interior chamber 26 side which is exposed to first passage 36. To close the valves 80, 61, first passage 36 is vented to the atmosphere and air is admitted through secondary passage 38 allowing piston 42 to move to the right. Spring 86 can then return valve 80 to he closed position.

To release the tool adapter 11 from the tool changer 12, the piston 42 is further moved to the right (towards robot 9) by the further admittance of pressurized air into the passage 38. The piston 42 will move to the right until it contacts the flange 73 thereby pulling rod 44 to a position of non-engagement (against the action of spring 96) with locking balls 52 thereby allowing tool adapter 11 to be pulled away.

Rod 44 cannot move to an engaged position unless closure ring 58 has been pushed toward robot 9 by axially elongated member 15. When rod 44 is in a non-engaged position (FIG. 7), piston 42 cannot make contact with valve end 87 because piston 42 is prevented from moving to contact valve end 87 by step 69. The above is true even when second passage 38 is vented to the atmosphere and first passage 36 is fully pressurized. Therefore the tool adapter 11 and tool changer 12 must first mate, couple and seal (by virtue of contact of seal ring 250 with O-ring 90) before piston 42 can contact valve stem end 87. Since coupling occurs before the valves 80 and 61 are opened, the force required to compress valve springs 86 and 64, and the fluid reactive force when valves 80 and 61 are opened will not occur during coupling. Furthermore, the above forces will not be transmitted to the robot or like.

The valves 61 and 80 will be closed by springs 64 and 86, respectively, before the tool adapter 11 can disconnect from the tool changer 12 since the rod 44 cannot be retracted until the piston 42 moves towards the robot 14 enough to no longer contact valve stem end 87. Fluid communication in lines 23a and 23b will therefore be cut off before seal ring 250 is removed from contact with O-ring 90 or before tool adapter 11 is released from tool changer 12. Therefore, the only entrapped liquid in lines 23a and 23b will be that which slightly surrounds the valves poppets 63 and 81 which is a minimal amount.

To use lines 23a and 23b for liquid or air will not require any modification. However, in situations wherein air is being delivered to the EOAT 7 rather than a liquid, the leakage of air from the tool adapter 11 is usually no critical. In such cases the valves 61 of the tool adapter 11 can be eliminated if desired.

It is an object of the present invention to provide a method of connecting an EOAT 7 with a fluid line 23a to a robot 14 or like with a fluid line 23b including the following steps:

1. Connecting with said EOAT 7 a tool adapter 11 for holding said EOAT 7 with at least one fluid line 23a; and 2. Connecting with said robot 14 or like a tool changer 12 adapter for coupling, sealing and then sequentially fluidly communicating with said tool adapter 11;

3. Valving 80 said fluid line 23b in said tool changer 12 with a valve biased in a closed position;

4. Connecting said tool changer 12 to said tool adapter 11;

5. Sealing said fluid line 23b of said tool adapter with said fluid line 23b of tool changer 12;

6. Opening said valve 80 of said tool changer 12 whereby fluid communication between said fluid line 23 of said tool adapter 11 and said tool changer 12 can only occur after said tool adapter 11 and said tool changer 12 are connected with one another and said fluid lines 23b and 23a of said tool changer 12 and said tool adapter 11 are sealed 250, 90 to one another and whereby said valve 80 of the tool changer 12 is returned to a closed position before said tool changer 12 and said tool adapter 11 can separate from one another.

While an embodiment of the present invention has been explained, it will be readily apparent to those skilled in the art of the various modifications which can be made to the present invention without departing from the spirit and scope of this application as it is encompassed by the following claims.

We claim:

1. A quick disconnect coupling for coupling an end of arm tool (EOAT) with at least one fluid line to a robot or like with at least one fluid line, said coupling in combination comprising:

a toll adapter for holding said EOAT having at least one fluid line; and a tool changer for connection with said robot or like, said tool changer being adapted for coupling and sealing, and then sequentially fluidly communicating with said tool adapter, said tool changer including:

a shell with at least one fluid line with a valve biased to a closed position;

means to couple said tool changer shell to said tool adapter in a positionally fixed manner;

means for contact with said tool adapter to seal said fluid passage of said tool adapter with said fluid passage of said tool changer; and means to open said biased valve of said tool changer fluid line whereby fluid communication between said fluid line of said tool adapter and aid fluid line of tool changer can occur only after said tool adapter and said tool changer shell are coupled with one another in a positionally fixed manner and said tool adapter and said tool changer fluid lines are sealed to one another and whereby said valve of said tool changer is returned to a closed position before said tool changer and said tool adapter can separate from one another.

2. A quick disconnect coupling as described in claim 1 wherein said tool adapter has a normally biased closed valve within said tool adapter fluid line and wherein said tool adapter valve cannot be opened unless said tool adapter is coupled to said tool changer and said line of said tool adapter is sealed with said tool changer, and wherein said tool changer cannot disconnect from said tool adapter until said valve said tool adapter has returned to a closed position.

3. A quick disconnect coupling as described in claim 1 with a plurality of fluid lines in said tool changer aligned with said fluid lines of said tool adapter, each said line in said tool changer having a normally biased closed valve which cannot open until said tool changer shell is connected to said tool adapter in a positionally fixed manner and said respective fluid lines of said tool changer and said to adapter are sealed to one another.

4. A quick disconnect coupling as described in claim 1 wherein said normally biased close valve is a poppet valve.

5. A quick disconnect coupling as described in claim 4 further including a piston slidably mounted within a sealed chamber of said tool changer and wherein said valve is connected to a stem and wherein said chamber may be pressurized to selectively engage said piston with said valve stem to open said valve.

6. A quick disconnect coupling for connecting an end of arm tool (EOAT) with a fluid line to a robot or like with a fluid line, said coupling in combination comprising:
 a tool adapter for holding said EOAT, said tool adapter having a generally axial central cavity, and at least one generally axially orientated member boarding said central cavity and projecting towards said robot or like, and said tool adapter having a fluid line with a poppet valve biased to a closed position; and
 a tool changer adapted for sequentially mating, coupling and sealing and then fluidly communicating with said tool adapter, said tool changer being connected with said robot or like, said tool changer including:
  a shell having a fluid line, and said shell having a generally axial interior chamber and said interior chamber having a first passage fluidly connecting the outside of said shell and said interior chamber, said interior chamber having at least one generally radial aperture intersecting said chamber axially separated from said first passage and towards said tool adapter;
  a rod slidably mounted in said interior chamber and biased towards said EOAT, said rod having a cam portion adjacent said radial aperture;
  a locking member movably mounted within said radial aperture for interacting with said cam portion of said rod and said axially orientated member to couple said tool changer with said tool adapter;
  closure means biased to a first position whereby said radial aperture is closed when said tool changer and said tool adapter are not mated and said closure means being moved to a second position by said axially orientated member to open said radial aperture when said tool changer and said tool adapter are mated, the opening of said radial aperture allowing said biased piston rod to move to a position to cause said locking member to be captured between said cam portion of said rod and said axially orientated member coupling said tool changer with said tool adapter;
  a stem poppet valve within said fluid line biased to a closed position;
  means on said shell to seal said fluid line of said tool changer with said fluid line of said tool adapter; and
  a piston slidably mounted within said interior changer whereby said piston is responsive to a fluid fed within said interior chamber through said first passage to move to a position to engage said tool changer valve stem to open said tool changer valve and to cause said tool changer valve to contact said tool adapter valve, opening said tool adapter valve thereby allowing fluid communication between said tool adapter and said tool changer only after said biased rod has moved to a position coupling said tool changer with said tool adapter and sealing said line of said tool changer with said line of said tool adapter, and whereby said rod cannot return to a position allowing said tool changer to disconnect from said tool adapter until said valves in said tool adapter and tool changer have returned to a closed position.

7. A quick disconnect coupling as described in claim 6 wherein said piston surrounds said rod and wherein there are first and second fluid passages connecting with said interior chamber axially separated from one another by said piston.

8. A tool changer a described in claim 6 wherein said rod has a step portion and piston is slidably mounted on said rod, and after said rod has moved to a locking position, said piston in response to a fluid fed within said interior chamber through said first passage can make contact said step portion of said rod to further engage said rod with said locking member to increase the force of coupling between said tool adapter and said tool changer.

9. A quick disconnect coupling as described in claim 6 wherein the biasing said rod is independent of the position of said piston.

10. A quick disconnect device as described in claim 6 wherein said rod has a flange portion and wherein movement by said piston in response to a fluid fed into said chamber can allow said piston to pull said rod toward said robot or like to disconnect said tool adapter from said tool changer.

11. A quick disconnect coupling for connecting an end of arm tool (EOAT) with fluid lines to a robot or like, said coupling in combination comprising:
 a tool adapter for holding said EOAT having a generally axial central cavity and a generally axially orientated member boarding said central cavity projecting toward said robot or like, and said tool adapter having a plurality of fluid lines with poppet valves biased to a close position; and
 a tool changer adapted for sequentially mating, coupling and sealing, and then fluidly communicating with said tool adapter, said tool changer being connected with said robot or like and said tool changer including:
  a shell with a generally axial interior chamber, aid shell also having first and second passages axially separated from one another fluidly connecting the outside of said shell with said interior chamber and said shell having a plurality of geometrically spaced radial apertures intersecting said interior chamber axially separated from said first and second passages and being towards said tool adapter;
  a rod slidably mounted in said interior chamber spring biased toward said tool adapter with a cam portion adjacent said radial apertures and said rod also having a flange toward said robot or like and a step between said radial apertures and said flange;

locking ball mounted within said radial apertures for interacting with said cam portion of said rod and said axially orientated member to couple said tool changer with said tool adapter;

closure means biased to a first position whereby said radial apertures are closed when said tool changer and said tool adapter are not mated and being moved to a second position by said axially orientated member to open said radial aperture when said tool changer in said tool adapter are mated, the opening of said aperture allowing said rod to move to a position causing said locking balls to be captured between said cam portion of said rod and said axially elongated member to couple said tool changer with said tool adapter;

sealing means causing said fluid lines of said tool adapter and said tool changer to seal with one another when said tool adapter and said tool changer are coupled with one another;

a poppet valve with a stem extending into said interior chamber, said poppet valve being biased to a closed position; and a piston located within said interior chamber separating said first and second passages, said piston being slidably mounted on said rod between said step and said flange whereby said piston in response to a fluid being fed into said interior chamber through said first passage can contact with said valve stems of said tool changer to open said valves of said tool changer and said tool adapter only after said rod has moved to coupled said tool adapter with said tool changer and said piston can be further moved toward said tool adapter to contact the step of said rod to further lock said tool adapter to said tool changer and whereby said piston must be moved from said tool adapter in response to a fluid fed into said interior chamber through said second passage to allow said valves of said tool adapter and said tool changer to return to a closed position and then sequentially move further toward said robot or like to contact said flange to pull said rod away from said tool adapter to allow said tool adapter to disconnect from said tool changer thereby insuring the closure of said valves before said tool adapter or said tool changer are released from one another.

12. A method of connecting an end of arm tool (EOAT) with a fluid line to a robot or like with a fluid line, said method in combination comprising:

connecting with said EOAT a tool adapter for holding said EOAT with at least one fluid line; and connecting with said robot or like a tool changer adapter for coupling, sealing and then sequentially fluidly communicating with said tool adapter;

valving said fluid line in said tool changer with a valve biased in a closed position;

connecting said tool changer to said tool adapter in a positionally fixed manner;

sealing said fluid line of said tool adapter with said fluid line of tool changer;

opening said valve of said tool changer whereby fluid communication between said fluid line of said tool adapter and said tool changer can only occur after said tool adapter and said tool changer are connected with one another in a positionally fixed manner and said fluid lines of said tool changer and said tool adapter are sealed to one another and whereby said valve of the tool changer is returned to a closed position before said tool changer and said tool adapter can separate from one another.

* * * * *